(No Model.)

C. MILLER.
MUSTACHE GUARD.

No. 258,243. Patented May 23, 1882.

Witnesses:
Robert Haas.
Friedrich Jäger

Inventor:
Charles Miller.

UNITED STATES PATENT OFFICE.

CHARLES MILLER, OF BOONVILLE, MISSOURI.

MUSTACHE-GUARD.

SPECIFICATION forming part of Letters Patent No. 258,243, dated May 23, 1882.

Application filed January 10, 1882. (No model.)

*To all whom it may concern:*

Be it known that I, CHARLES MILLER, of the city of Boonville, in the county of Cooper, State of Missouri, have invented certain new and useful Improvements in Mustache-Guards and Training-Clamps; and I do hereby declare that the following is a full, clear, and exact description of the invention, which will enable others skilled in the art to which it appertains to make and use the same, reference being had to the accompanying drawings, which form part of this specification.

Figure 1:
Figure 2:
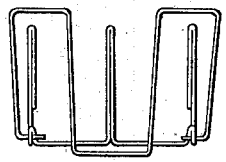
Figure 3:

Figure 1 is the guard or clamp as applied to the mustache; Fig. 2, a front view of guard or clamp; Fig. 3, a side view.

The object of my invention is twofold: first, to provide an adjustable, elastic, and easily-applied guard to prevent the mustache from coming in contact with food or drinks; second, to so construct said guard as to easily and compactly clamp the mustache in any desired form, to the end that it may be comfortably worn at night, thereby training the mustache to permanently assume the desired form.

The device consists of a hinged wire clamp, formed of two pieces of wire, so formed as to resemble a buckle hinged at one side. The piece applied next the lip is formed like a three-pronged fork, with eyes formed or turned at the lower side for the hinge. The outer piece is bent in similar form, but with broad open bends, with the middle portion passing below the hinged joint and bearing against the first or inner piece to form a spring, the ends of the wire forming the second or outer piece being bent at a right angle and sprung into the eyes formed in the first piece, thereby forming a hinge. (See Figs. 2 and 3.)

To apply the device, open the guard or clamp, press the mustache in a compact mass close to the lip, pass the three-pronged part close to the lip under the mustache, and close the clamp. To remove the device grasp the mustache to steady it and open the clamp.

I am aware that a device has been invented to accomplish the same result by the use of two semi-cylindrical shells hinged at one edge, but its use is unsightly and impracticable, owing to its clumsy, inconvenient form and rigid construction; while my invention is an entirely different device, is cheap, simple, compact, elastic, comfortable, and not unsightly.

Having thus described my invention, I claim and desire to secure by Letters Patent of the United States—

A mustache guard and trainer consisting of a wire spring-clamp adapted for adjustment upon the mustache, as herein set forth, and for the purposes herein described.

CHARLES MILLER.

Witnesses:
ROBERT HAAS,
T. FRIEDRICH TÄGER.